United States Patent [19]

Krawetz et al.

[11] Patent Number: 4,850,551
[45] Date of Patent: Jul. 25, 1989

[54] PROPULSION SYSTEM FOR A BUOYANT VEHICLE

[75] Inventors: Barton Krawetz, Studio City; Leo Celniker, Woodland Hills, both of Calif.

[73] Assignee: Lockheed Corporation, Calabasas, Calif.

[21] Appl. No.: 132,839

[22] Filed: Dec. 14, 1987

[51] Int. Cl.⁴ .............................................. B64B 1/58
[52] U.S. Cl. ........................................ 244/97; 244/25
[58] Field of Search ................................ 244/94–99, 244/128, 2 R, 25

[56] References Cited

U.S. PATENT DOCUMENTS

| | | | |
|---|---|---|---|
| Re. 16,164 | 9/1925 | Hall | 244/2 |
| 43,449 | 7/1864 | Andrews | 244/30 |
| 1,821,061 | 9/1931 | Jenkins | 244/25 |
| 2,094,619 | 10/1937 | Reichert et al. | 244/97 |
| 2,157,045 | 5/1939 | Wiese | 244/25 |
| 2,379,355 | 5/1945 | Hodgdon | 244/25 X |
| 3,157,145 | 11/1964 | Farris et al. | 114/16 |
| 3,446,457 | 5/1969 | Struble, Jr. | 244/30 |
| 3,620,485 | 11/1971 | Gelhard | 244/97 |
| 4,032,086 | 6/1977 | Cooke | 244/97 |
| 4,261,534 | 4/1981 | Roselli | 244/28 |
| 4,394,998 | 7/1983 | Taillet et al. | 244/97 |
| 4,457,477 | 7/1984 | Regipa | 244/97 |
| 4,711,416 | 12/1987 | Regipa | 244/97 |

FOREIGN PATENT DOCUMENTS 0031981 7/1981 France ................................ 244/97

*Primary Examiner*—Joseph F. Peters, Jr.
*Assistant Examiner*—Gregory R. Poindexter
*Attorney, Agent, or Firm*—L. L. Dachs

[57] ABSTRACT

The invention is a propulsion system for a buoyant aircraft. The invention comprises a gas storage container filled with a lighter-than-air gas and having outer walls of which at least a portion thereof are flexible. A system is provided to move the flexible portions of the walls alternately inward and outward varying the internal volume of the container, thus, varying the buoyancy of the aircraft and providing a propulsive force. Air foils mounted on the aircraft are adapted to provide trimming forces as the aircraft descends and ascends.

3 Claims, 3 Drawing Sheets

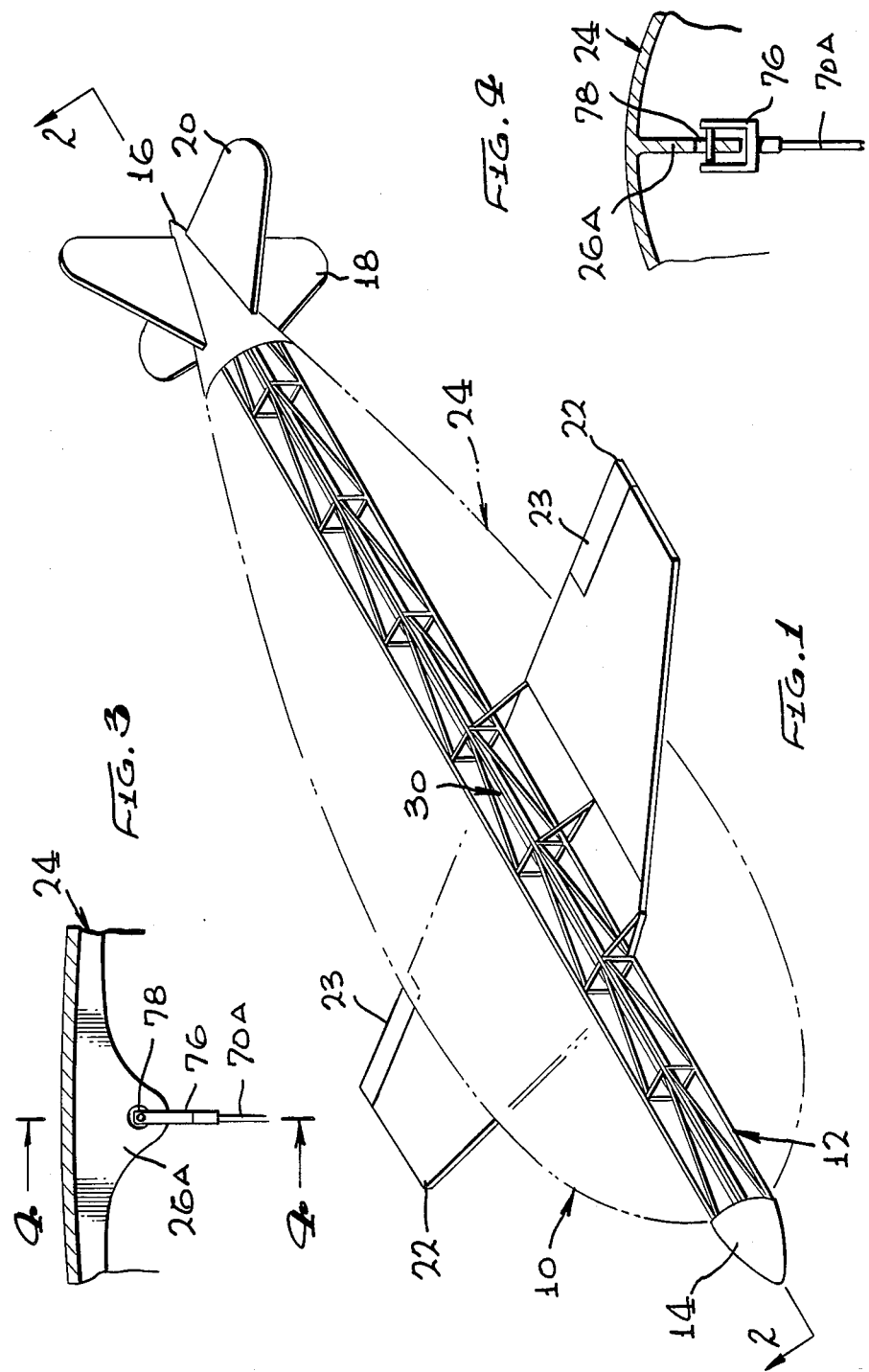

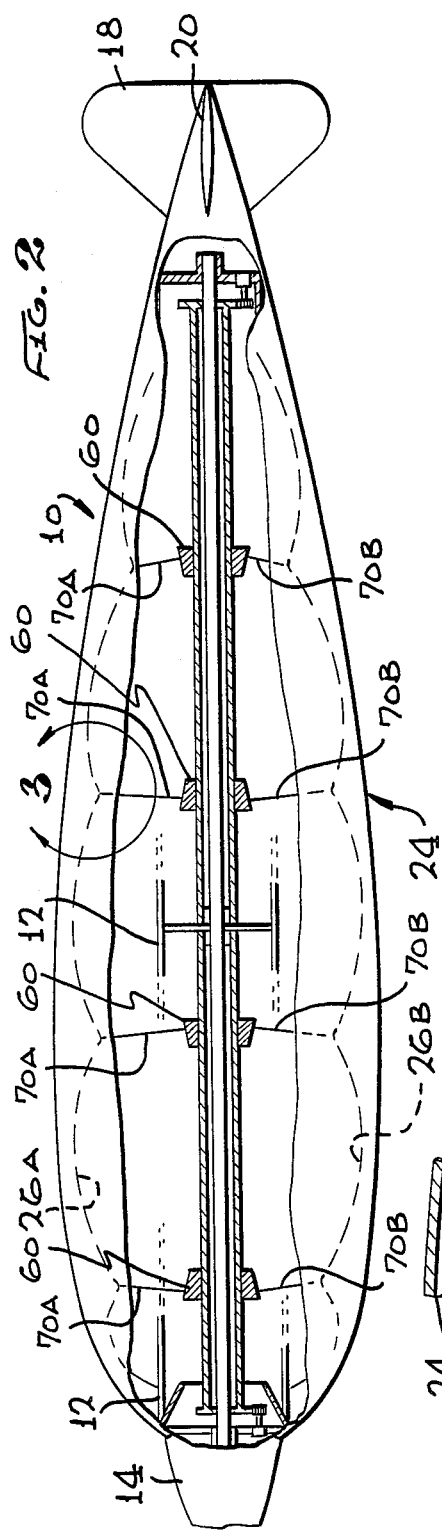

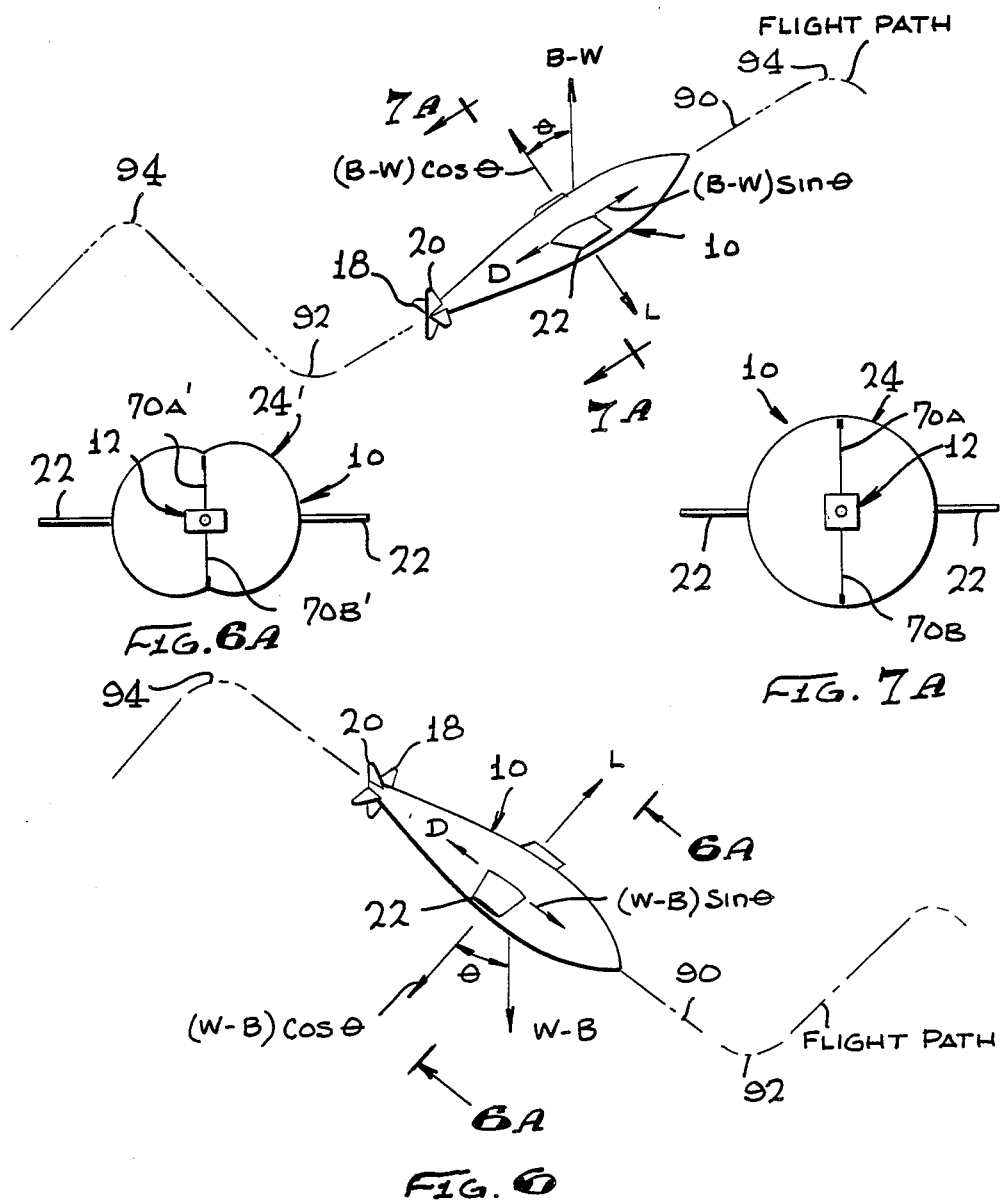

0
PROPULSION SYSTEM FOR A BUOYANT VEHICLE

TECHNICAL FIELD

The invention relates to the field of propulsion system for buoyant vehicles and, in particular, to a propulsion system that makes use of the forces produced by changes in buoyancy to provide forward thrust.

BACKGROUND INFORMATION

There is a continuing need for high altitude, long duration station keeping and reconnaissance aircraft. For example, the placement of a single cellular phone communications beacon at approximately 100,000 feet would provide complete coverage for a large area, the size of Southern California. There is no danger of interference with commercial aircraft flight and winds are low as compared with those occurring at lower altitudes. Such an aircraft would be cost effective if it could be kept on station for periods in the three year range, and if energy consumption were kept to a minimum. The use of a high altitude, long range and long duration aircraft with a reasonable price tag for weather reconnaissance and atmospheric research in general to replace the unpredictable untethered balloon is also much desired.

Consideration has been given to using electrically powered hovercraft for the station keeping mission, where the power is supplied by microwaves beamed up from ground stations. However, energy consumption is large and there is the danger of vehicles flying through the microwave beam. Furthermore, such vehicles could not be used in remote areas where electrical power is unavailable. Of course, any mission requiring significant changes in location would be out of the question.

A solar powered aircraft is another alternative. However, for station keeping the power requirements are so large that solar power alone is not practical. Additionally, the question arises as to how to power the vehicle during nighttime periods.

Dirigibles and blimps have been considered for such missions since they can provide significant fuel savings because no energy is required to support the vehicle structure and payload. However, buoyant vehicles using conventional propulsion systems could not meet the three year mission duration requirement.

An unconventional propulsion concept is disclosed by S. Andrews in U.S. Pat. No. 43,449 "Aerial Navigation" patented July 5, 1864. By alternately dropping ballast weights and venting off gas, the vehicle can be made to rise and fall. The center of gravity is varied causing a change in the angle of attack of the vehicle to provide trim as the vehicle rises and falls. The problem with this concept is that there is only a limited amount of gas and number of ballast weights that can be released, thus, severely limiting the range of the craft.

A more advanced version of obtaining forward thrust by alternately ballasting and deballasting, causing the vehicle to porpoise through the water, is disclosed in U.S. Pat. No. 3,157,145 "Underwater Glider" by F. E. Farris et al. Although designed as a submarine, the concept is applicable to aircraft. Here, the ballast tanks are alternately filled with water and then pumped out with air causing the vehicle to alternately descend and ascend. Hydrodynamic surfaces are then used to provide lift forces for trimming. While this propulsion system could be applied to buoyant aircraft by using air and helium, or hydrogen gas combination instead of water and air, there is a finite number of cycles limiting the duration of any mission.

Thus, it is a primary object of the invention to provide a propulsion system for a buoyant aircraft that can maintain the aircraft aloft at high altitudes for long periods of time.

It is another primary object of the subject invention to provide a propulsion system for a buoyant aircraft that provides forward thrust by changing the buoyancy of the aircraft.

A further object of the subject invention is to provide a propulsion system for a buoyancy aircraft which maintains a constant mass of buoyant gas.

DISCLOSURE OF THE INVENTION

The invention is a propulsion system for a buoyant aircraft. In broad terms, the invention comprises a buoyancy control means mounted to the aircraft for alternately causing the ascent and descent of the aircraft and airfoil means for trimming the aircraft as the aircraft alternately ascends and descends. The buoyancy control means includes a gas storage container filled with a lighter-than-air gas. Preferably, this would be the main gas bag. Additionally included is a volume varying means for varying the internal volume of the container or bag while maintaining a constant mass of gas therein. The excess buoyancy in the ascent phase and the excess weight in the ascent phase provides a thrust component sufficient to sustain a forward velocity to counter the anticipated winds at the selected altitude and maintain a constant position over a selected location on the earth or alternately to provide translation.

In detail, the gas storage container includes outer walls where at least a portion thereof are flexible. The volume varying means is coupled to the flexible portions of the outer wall and is adapted to alternately cause the flexible portions to move from a first position inward to a second position compressing the gas and reducing the buoyancy of the aircraft causing the aircraft to descend outwardly and then back to the first position increasing the buoyancy of the aircraft causing the aircraft to rise. This is accomplished by means of a plurality of cables attached by their ends to the flexible walls via catenary curtains. The opposite ends of the cables wind about spools mounted on a pair of hollow tubular shafts. The tubular shafts are fixed to each end of a torsional spring rotatably mounted within the aircraft. The tubular shafts are coupled by gears to a pair of drive motors which are adapted to wind and unwind the cables on the spools. The torsional spring is positioned such that when the flexible walls are in the first position (the container is expanded) the spring is wound to provide maximum torque and provides minimum torque when the flexible portions are in the second position (drawn inward).

The spools have a variable diameter along their length so that when the flexible walls are in the first position, the torque on the spools is balanced by the torsional spring and the torque on the spools remain constant as the flexible portions move inward to the second position as the torque exerted by the spring diminishes. If there were no friction losses in this mechanism or loss in energy due to heat produced by the gas alternately heating and cooling as it is compressed and expanded the flexible portions would oscillate between the first and second positions. However, since there are loses the drive means is sized to make up for any such losses or any imbalances that exist within the system.

In detail, the airfoil means comprises a conventional wing with ailerons and horizontal and vertical stabilizers to control the pitch, yaw and roll. Thus, when the buoyant vehicle is at a maximum altitude the drive means is used to rotate the spools causing the flexible portions to move inward. The decrease in the volume of the container with a corresponding loss in buoyancy causes the aircraft to fall. As the aircraft descends at a glide angle, a component of the vertical force ([weight −buoyant force]×SIN $\theta$) is in the direction of flight and opposes the drag force. The component normal to the flight path of the aircraft is equal to the ([weight −the buoyant force) ×the COS $\theta$) and is opposed by the lift forces of the wing. When the buoyant force again equals the weight of the aircraft the flexible portions are allowed to expand causing the aircraft to rise. As the aircraft ascends at an angle, a component of the vertical force, ([buoyant force −weight]×SIN $\theta$) is in the direction of flight and opposed by the drag force. The vertical component ([buoyant force −weight]-×COS $\theta$]perpendicular to the direction of flight is counteracted by the lift force. Thus, the vehicle will travel with a porpoise like motion requiring a minimum of energy.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a perspective view of the buoyant aircraft partially broken away to show the interior thereof.

Illustrated in FIG. 2 is a cross-sectional view of the buoyant aircraft shown in FIG. 1 taken along the line 2—2.

Illustrated in FIG. 3 is an enlarged view of a portion of FIG. 2 indicated by numeral 3.

Illustrated in FIG. 4 is a partial cross-sectional view of FIG. 3 taken along the line 4—4.

Illustrated in FIG. 5 is an enlarged fragmented view of the central portion of FIG. 2.

Illustrated in FIG. 6 is a schematic representation of the flight of the vehicle when in the descent mode.

Illustrated in FIG. 6A is a cross-sectional view of the vehicle shown in FIG. 6 taken along the line 6A.

Illustrated in FIG. 7 is a schematic representation of the vehicle flight path with the vehicle in the ascent mode.

Illustrated in FIG. 7A is a cross-sectional view of the vehicle shown in FIG. 7 taken along the line 7A.

BEST MODE FOR CARRYING OUT THE INVENTION

Illustrated in FIG. 1 is a perspective view of a buoyant aircraft, generally designated by numeral 10, partially broken away to show the interior thereof. The vehicle concludes a main support structure 12 connected to nose and tail structures 14 and 16, respectively. In this embodiment, the nose structure 14 houses a payload (not shown); however, the payload could just as well be carried elsewhere on the aircraft and its location would depend upon the mission thereof. Mounted to the tail structure 16 are vertical and horizontal stabilizers 18 and 20, respectively, providing yaw and pitch control. Additionally, wings 22 provide lift force and incorporate ailerons 23 for roll control. Joined to the nose and tail structures 14 and 16, respectively, is a flexible gas bag or container 24. The container 24 is a conventional design typically consisting of Mylar or woven cloth impregnated with rubber-like compounds to make it impermeable to lighter-than-air gases such as hydrogen or helium and sized to provide sufficient buoyancy to reach the desired altitude. Thus, it can be seen that the aircraft 10, thus far described, is conventional in design and need not be discussed in greater detail.

Illustrated in FIG. 2 is a cross-sectional view of the aircraft shown in FIG. 1 taken along the line 2—2, while illustrated in FIG. 3 is an enlarged view of a portion of the aircraft shown in FIG. 2, indicated by numeral 3. FIG. 4 is a partial cross-sectional view of FIG. 3 taken along the line 4—4. Additionally, FIG. 5 is an enlarged view of a portion of FIG. 2. Still referring to FIG. 1 and additionally to FIGS. 2-5 it can be seen that catenary curtains 26A and 26B are attached to the top and bottom of the container 24. A torsional spring 30 is rotatably mounted at its forward end 32 to the nose structure 14 and its ear end 37 to the tail structure 16 and at its middle portion 36 by means of bearings 38A, 38B and 38C, respectively. The spring 30 can be in the form of a hollow torque tube or torsion bar.

A forward hollow shaft 40 extends about the spring 30 and includes a gear 42 at its first end 43 which is rigidly attached to front end 32 of the spring 30. The hollow shaft 40 is rotatably supported at its second end 44 by the structure 12. A second hollow shaft 46 also extends about the spring 30 and includes a gear 48 mounted, at its first end 49 rigidly attached to the rear end 37 of the spring 30. The second end 50 of the second hollow shaft 46 is rotatably mounted in the structure 12. A pair of gear drive assemblies 52 and 54 having drive gears 52A and 54A, respectively, the drive gears 52A and 54A engage gears 42 and 48 of the hollow shafts 40 and 46, respectively. The gear drive assemblies 52 and 54 are adapted to drive the hollow shafts 40 and 46 in opposite angular directions about the spring 30 and, thus, when in operation tend to either wind and unwind the spring 30. Mounted to the hollow tubes 40 and 46 are spools 60. While four spools 60 are shown, the number of spools will vary with the size of the vehicle.

Cables 70A and 70B are attached to the top and bottom catenary curtains 26A and 26B, respectively, and by their opposite ends to the spools 60. Particularly referring to FIGS. 3 and 4 it can be seen that the cable 70A terminates in a clevis assembly 76 which engages hole 78 in the catenary curtain 26A. The cables 70B are similarly attached to the catenary curtain 26B, and thus, a further description of them is deemed unnecessary.

Again referring to the FIGS. 1 through 5, the spools 60 are shown with tapered outer diameters having grooves 80 for receiving the cables 70A and 70B. The aircraft is designed and assembled such that when the container 24 is fully inflated, the spring 30 is wound up to an angular position to apply maximum torque to the spools 60. However, the cables 70A and 70B are positioned at ends 60A of the spools 60. While there is minimal gas pressure within the container 24 the diameter of the grooves 80 in the spools 60 at ends 60A are at a maximum and the torque applied by the container 24 via cables 70A and 70B to the spools 60 substantially balances the torque of the spring 30. As the container 24 moves from the expanded position to the contracted position, indicated by numeral 24′ the cables 70A and 70B move down the spools 60 to ends 60B the position of which is indicated by numeral 70A′ and 70B′. Although the contracted container, indicated by numeral 24′ has the greatest internal gas pressure due to compression and the spring 30 torque is at a minimum, the diameter of the groove 80 at end 60B are also a minimum. Thus, the total torque on the spools 60 has not changed. The diameters of the grooves 80 between the ends 60A and 60B of the spools 60 are sized to maintain this balanced torque condition as the container moves from the expanded to the contracted positions and visa-versa. If there were no losses due to friction, hysteresis in the spring and internal energy losses in the gas due to compression and expansion of the gas, the container would oscillate back and forth from the expanded to the contracted position much like a pendulum. However, in any real system there are losses. Thus, the gear drive assemblies 52 and 54 not only accommodate for any imbalances, but also compensate for losses of energy. However, the gear drives 52 and 54 need only be sufficiently large to overcome the aforementioned imbalances and energy losses to move the container 24 back and forth from the expanded to the compressed positions. It must be noted at this point that in the embodiment illustrated only the top and bottom portions of the container 24A and 24B need be flexible and other portions could be ridged. It is therefor necessary that only a portion of the container 24 be flexible.

Having described the system it is now necessary to describe how the aircraft translates. In FIGS. 6 and 7, B=Buoyant Force, W=Weight, L=Lift Force, D=Drag Force and $\theta$=Climb/Descent Angle. Referring to FIG. 6 and 6A with the container 24 in the contracted position indicted by numeral 24′, buoyancy of the vehicle is less than the weight and there is a net downward force equal to (weight >buoyant force). The forward component of this force is (weight −buoyant force) $\times \text{SIN } \theta$; where $\theta$ is the descent angle which is controlled by the horizontal stabilizer 20. The lift component is balanced by a component of the downward force equal to (weight −buoyant force)$\times \text{COS } \theta$. The aircraft descends along flight path 90 to a point where the weight equals the buoyant force which is indicated on the flight path 90 as point 92. At point 92 the gear drives 52 and 54 are actuated and the container 24 expands. As shown in FIGS. 7A and 7A at this point, with the buoyant force greater than the weight the aircraft rises. With the vehicle positioned to provide an ascent angle the thrust or force along the flight path 90 is given by (buoyant force −weight) $\times \text{SIN } \theta$ and the lift force is counteracted by the equal and opposite force (buoyant force −weight) $\times \text{COS } \theta$. This upward movement is continued until the weight again equals the buoyant force at point 94 of the flight path. At this point the gear drives 52 and 54 are again activated causing the container 24 to contract and the weight again exceeds the buoyant force and the aircraft starts to descend.

Thus, it can be seen that as the aircraft continuously descends and ascends and the airfoil means properly trimming the aircraft forward motion is obtained. Furthermore, since the losses in the propulsion system are relatively small only a small battery system and solar panels for recharging are required. In fact, it may be possible to take a small penalty in forward speed and periodically extend an air turbine driven generator to charge the batteries. It has been determined that altitude variations as little as 200 to 400 feet with a five to twenty percent change in container volume can provide 25 to 50 knot forward velocities and three year, long range and station keeping missions are possible. It is also readily apparent that a buoyant vehicle using the subject propulsion system could be used for many missions now accomplished by orbiting satellites.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The propulsion system has applicability on buoyant aircraft.

What is claimed is:

1. A propulsion system for translating a buoyant aircraft in a generally horizontal direction comprising:
    buoyancy control means mounted on said aircraft for alternately producing upward and downward thrust forces causing the ascent and descent, respectively, of the aircraft, said buoyancy control means comprising:
        a gas storage container having walls at least a portion of which are flexible, said container filled with a constant mass of lighter-than-air gas; and
        volume varying means coupled to said flexible portions of said wall for alternately causing said flexible portions to move inward from a first position to a second position compressing said gas and decreasing the volume of said container and to move outward allowing said compressed gas to expand and to move from said second position to said first position increasing the internal volume of said container;
        force balancing means coupled to said volume varying means for generally balancing the varying force on said flexible portions of said walls as said walls alternately move from said first position to said second position produced by the alternating increasing and decreasing of pressure produced by said gas;
        an airfoil mounted to the aircraft for providing a lift force generally opposing the upward and downward thrust as the aircraft ascends and descends; and
    trimming control means for providing pitch control as the aircraft ascends and descends such that a portion of the lift force is directed along the desired flight path.

2. A propulsion system for translating a buoyant aircraft in a generally horizontal direction comprising:
    buoyancy control means mounted on said aircraft for alternately producing upward and downward thrust forces causing the ascent and descent, respectively, of the aircraft, said buoyancy control means comprising:
        a gas storage container having walls at least a portion of which are flexible, said container filled with a constant mass of lighter-than-air gas; and volume varying means coupled to said flexible portions of said wall for alternately causing said flexible portions to move inward from a first position to a second position compressing said gas and decreasing the volume of said container and to move outward allowing said compressed gas to expand and to move from said second position to said first position increasing the internal volume of said container, said volume varying means comprising:

cable means having first and second ends, said first ends of said cable means coupled to said flexible portion of said walls of said container;

spool means coupled to said second end of said cable means for receiving said cable means; and drive means coupled to said spool means for alternately winding and unwinding said cable means on said spool means; and torque balancing means coupled to said spool means for generally balancing the torque applied to said spool means by said cable means as said flexible portions alternately move from said first position to said second position;

an airfoil mounted to the aircraft for providing a lift force generally opposing the upward and downward thrust as the aircraft ascends and descends; and trimming control means for providing pitch control as the aircraft ascends and descends such that a portion of the lift force is directed along the desired flight path.

3. The propulsion as set forth in claim 2, wherein said torque balancing means comprises;

a torsional spring coupled to said spool means; and said spool means having a variable diameter along its length such that said spring applies a torque to said spool means substantially equal to the torque produced by said flexible portions as said flexible portions move alternately from said first position to said second position.

* * * * *